US006948361B2

(12) United States Patent
Popielas et al.

(10) Patent No.: US 6,948,361 B2
(45) Date of Patent: Sep. 27, 2005

(54) GASKET FLOW SENSING APPARATUS AND METHOD

(75) Inventors: Frank W. Popielas, Plainfield, IL (US); Howard M. Robins, Buffalo Grove, IL (US); Jeffery A. Foster, Rolling Meadows, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/480,221

(22) PCT Filed: Jun. 12, 2002

(86) PCT No.: PCT/US02/19082

§ 371 (c)(1),
(2), (4) Date: Dec. 10, 2003

(87) PCT Pub. No.: WO02/101344

PCT Pub. Date: Dec. 19, 2002

(65) Prior Publication Data

US 2004/0144169 A1 Jul. 29, 2004

Related U.S. Application Data (60) Provisional application No. 60/297,701, filed on Jun. 12, 2001.

(51) Int. Cl.[7] .................................................. G01F 1/68
(52) U.S. Cl. .................................................. 73/204.22
(58) Field of Search ............................. 73/204.22, 116; 277/313

(56) References Cited

U.S. PATENT DOCUMENTS

| 5,121,929 A | 6/1992 | Cobb |
| 5,380,014 A | 1/1995 | Schaperkotter |
| 5,659,132 A | 8/1997 | Novak et al. |
| 5,804,712 A | 9/1998 | Staerzl |
| 6,161,510 A | 12/2000 | Ishikawa et al. |

*Primary Examiner*—Harshad Patel
(74) *Attorney, Agent, or Firm*—Rader, Fishman & Grauer, PLLC (57) ABSTRACT

An improved fluid flow sensor for measuring changes in temperatures of fluids flowing through apertures of a multiple-layered gasket is embedded between layers of the gasket. A thermal resistor type of sensor based upon hotwire anemometer technology in a preferred embodiment is responsive to changes in fluid temperature and flow velocity. A primary resistance with external current leads and separate auxiliary leads for voltage sensing are employed, wherein changes in resistance are virtually linearly proportional to changes in temperature. A four-point probe measurement method provides a most accurate reading of the temperature data to the extent that resistance associated with lead and contact resistances are minimized. The thermal resistor sensor is constructed of relatively thin layers of dielectric and electrically conducting materials having a low thermal mass, wherein the dielectric layers serve as support and electrical insulation to protect the sensor from environmental deterioration.

14 Claims, 10 Drawing Sheets

GASKET FLOW SENSING APPARATUS AND METHOD

This application claims priority from U.S. Provisional Patent Application No. 60/297,701, filed on Jun. 12, 2001, the contents of which are incorporated herein by reference in their entirety.

BACKGROUND OF THE INVENTION

1. Field of Invention

The present invention relates generally to flow rate sensing apparatus, and particularly to micro-fluidic methods applied to cylinder head gaskets for internal combustion engines. More specifically, the invention relates to apparatus and methods for measuring temperatures of fluids passing through apertures of cylinder head gaskets.

2. Description of the Prior Art

It is known to employ electronic sensors in cylinder head gaskets for sealing between engine components including, for example, the block and cylinder head of a multi-cylinder internal combustion engine. In one case, the gasket comprises a sealing plate having several combustion chamber orifices, and combustion chamber sealing elements at the edges of the sealing plate surrounding the combustion chamber orifices. The gasket includes sensor elements for cylinder-specific detection of sealing movements perpendicular to the plane of the sealing plate, caused by pressure changes in respective combustion chambers being measured. All of the sensor elements are arranged outside of the combustion chamber sealing elements and can be piezoelectric and piezoresistive, as well as glass fiber lightguide-style sensors.

In another example, a gasket enclosed sensor system is employed for measurement of combustion chamber parameters and delivery of signals to points external of the engine. The gasket includes a combustion opening substantially surrounding a combustion chamber, and includes an access opening extending from the combustion chamber to a point external of the engine. A metallic sensor terminal is positioned within the access opening, and insulating material substantially surrounds the metallic sensor terminal.

In yet another example, an oil flow sensor and associated circuitry are used to indicate presence of oil flow in a multi-cylinder internal combustion engine. The oil sensor includes a heating element positioned within the oil line, directly in the oil flow path. A comparator measures the value of signals from upstream and downstream heat sensors, and triggers a switching circuit when the temperature at the sensors approach one another to indicate an adequate oil flow to the engine. The disclosed oil flow sensor, however, is not associated with a combustion chamber gasket environment.

DETAILED DESCRIPTION OF THE PREFERRED EMBODIMENTS

The present invention provides an improved flow sensor for an automotive gasket. The flow sensor is designed to be embedded between layers of a multiple-layered combustion sealing gasket, typically including layers of metallic material such as steel, and is particularly effective to measure changes in temperatures of coolants or oil flowing through apertures of the gasket. The gasket of the disclosed embodiments is subjected to a range of temperatures including environmental ambient temperature and an elevated operational temperature such as that which takes place in an internal combustion engine.

Theoretical Considerations

Governing Equations of Hot-Wire (Film) Anemometry Application

1) Governing equation:

$$\frac{dE}{dt} = W - H$$

where, E=thermal energy stored in wire $$E_w = C_w \cdot T_s$$

Cw=heat capacity of wire
W=power generated by joule heating $$W = i^2 \cdot R_w$$

$R_w = f(T_w)$
H=heat transferred to surroundings
For equilibrium conditions the heat storage is zero: W=H and the Joule heating W equals the convective heat transfer H.
Here, H=Σ (convection to fluid+conduction to supports+ radiation to surroundings) where,
   Convection: $Q_c = Nu \cdot A \cdot (T_w - T_a)$
      $Nu = h \cdot d/k_f = f$ (Re, Pr, M, Gr, α)
      $Re = \rho \cdot U/\mu$
   Conduction: f ($T_w$, $l_w$, $k_w$, $T_{supports}$)
   Radiation: $f(T_w^4 - T_f^4)$
In here, basic assumptions are
Radiation losses small
Conduction to wire supports small
$T_w$ uniform over length of sensor
Velocity impinges normally on wire, and is uniform over its entire length, and also small compared to sonic speed.
Fluid temperature (?) and density constant 2) Static Heat Transfer:

$$W = H \rightarrow I^2 \cdot R_w = h \cdot A \cdot (T_w - T_a) \rightarrow I^2 R_w = (Nu\ k_f/d)A(T_w - T_a)$$

h=film coefficient of heat transfer
A=heat transfer area
d=wire diameter
$k_f$=heat conductivity of fluid
Nu=dimensionless heat transfer coefficient
Forced convection regime, i.e. Re>$Gr^{1/3}$ (0.02 in air) and Re<140→

$$Nu = A_1 + B_1 \cdot Re^n = A_2 + B_2 \cdot U$$

$$I^2 R_w^2 = E_w^2 = (T_w - T_a)(A + B \cdot U^n)\ \text{"King's law"}$$

The voltage drop is used as a measure of velocity or temperature.

3) The Resistance of Sensor Element is $$R_0 = \frac{1}{A_w \sigma_0}$$

Wire resistance can be written as: $R_w = R_o[1 + \alpha_o(T_w - T_o)]$
$R_w$=wire hot resistance
$R_o$=wire resistance at $T_o$
$\alpha_o$=temperature coefficient of resistance (TCR)
$\sigma_o$=thermal conductivity
$\rho_o$=thermal resistivity($1/\sigma_o$)
$T_w$=wire temperature
$T_o$=reference temperature
Define: "OVERHEAT RATIO" as: $a = R_w/R_a$
The voltage across wire is given by: $E_w^2 = I^2 R_w^2 = R_w(R_w - R_a)(A_1 + B_1 U^n)$ or as $R_w$ is kept constant by the servoloop:
$E_w = A + B U^n$ 4) Velocity and Temperature Sensitivity $$E_w^2/R_w = I^2 R_w = (R_w - R_a)(A_1 + B_1 U^n)$$

$$E = \frac{R_1 + R_L + R_w}{R_w} E_w, \quad \frac{E^2 R_w}{(R_1 + R_L + R_w)^2} = (A + BU^n)(T_w - T_a)$$

CT mode: $e_w = S_{74}\theta + S_u u$  ($e_w$=fluctuating voltage signal)

$$S_u = \frac{\partial E_w}{\partial U} = \frac{nBU^{n-1}}{2}\left[\frac{R_w(T_w - T_a)}{A + BU^n}\right]^{1/2}$$

$$S_\theta = \frac{\partial E_w}{\partial \Theta} = -\frac{1}{2}\left[\frac{R_w(A + BU^n)}{T_w - T_a}\right]^{1/2}$$

CC mode: $e_w = S_{\theta,cc}\theta + S_{u,cc} u$ $$S_{u,cc} = \frac{\partial E_w}{\partial U} = -\frac{(\overline{R}_w - \overline{R}_a)^2 nB\overline{U}^{n-1}}{I\overline{R}_a} = -\frac{nB\overline{U}^{n-1} I^3 \overline{R}_w^2}{R_a(A + B\overline{U}^n)^2}$$

$$S_{\theta,cc} = \frac{\partial E_w}{\partial \Theta} = \frac{\alpha_0 I \overline{R}_w R_0}{\overline{R}_a}$$

Modes of Anemometer Operation

Figure 1:
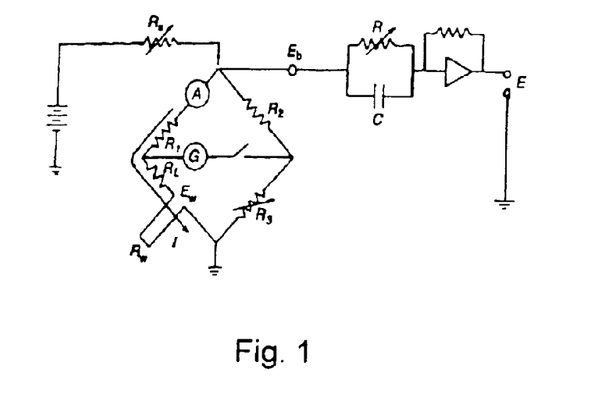
FIG. 1 illustrates an electric circuit of a Constant Current Anemometer (CCA) as designed in accordance with the present invention.

1) Constant current anemometer (CCA)—FIG. 1.
Principle: Current through sensor is kept constant
Advantages:—High frequency response
Disadvantages:—Difficult to use
   Output decreases with velocity
   Risk of probe burnout $$\frac{R_w + R_L}{R_1} = \frac{R_3}{R_2}$$

Figure 2:
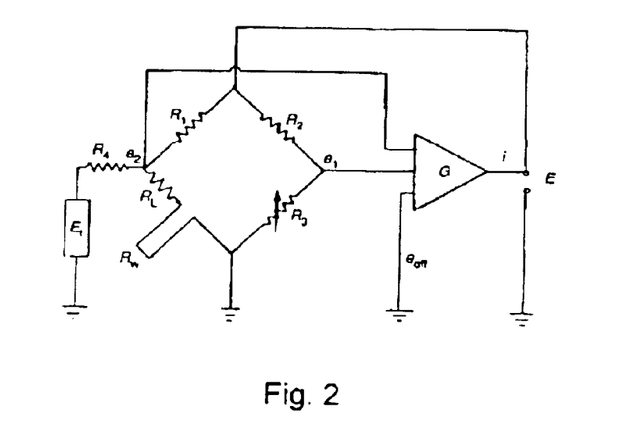
FIG. 2 illustrates an electric circuit of a Constant Temperature Anemometer (CTA) as designed in accordance with the present invention.

2) Constant Temperature Anemometer (CTA)—FIG. 2.

| | |
|---|---|
| Principle: | Sensor resistance is kept constant by servo amplifier |
| Advantages: | Easy to use |
| | High frequency response |
| | Low noise |
| | Accepted standard |
| Disadvantages: | More complex circuit |

Figure 3:
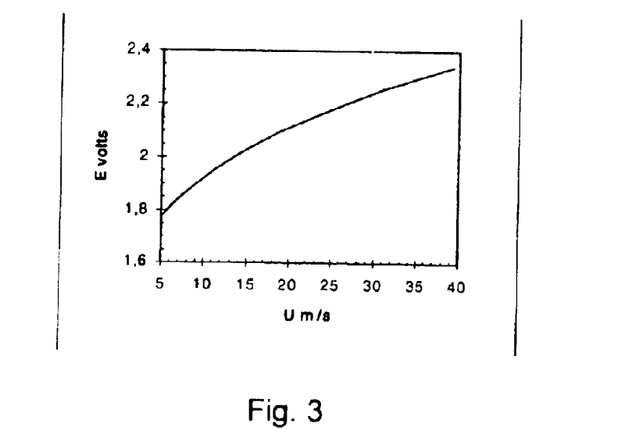
FIG. 3 is an output diagram relating to FIG. 1 and FIG. 2.

3) Note following comments to CTA and to CCA—FIG. 3:
   Response is non-linear:
      CCA output decreases
      CTA output increases
In CTA mode, sensitivity decreases with increasing U 4) Non-Isothermal Condition with CT Mode
For accurate velocity measurements, a hot-wire probe is usually operated at a high overheat ratio, making the ratio of the velocity sensitivity to the temperature sensitivity large. On most of the recent experimental methods, the smaller temperature term in equation is treated as a correction term, with the fluctuating temperature, measured independently by the resistive-wire (or Cold-wire) method. $S_\theta = S_{\theta,s} H_p'$ where, $H_p'$ is the lower than unity and it is the plateau level of the transfer function, $H_\theta(f)$.

The measurement of $\theta$ is usually carried out with a thin resistive-wire operated in the CC mode, and the following relationship applies for the measured temperature fluctuation, $\theta_m = H_p \theta$. Here, $H_p$ is the plateau level of the amplitude transfer function for the temperature fluctuations of the resistance-wire.

$$e_w = S_u u + S_\theta \theta = S_u u + S_{\theta,s}(H_p'/H_p)\theta$$

where $$S_u = \frac{\partial E_w}{\partial U} = \frac{nBU^{n-1}}{2}\left[\frac{R_w(T_w - T_a)}{A + BU^n}\right]^{1/2}$$

$$S_\theta = \frac{\partial E_w}{\partial \Theta} = -\frac{1}{2}\left[\frac{R_w(A + BU^n)}{T_w - T_a}\right]^{1/2}$$

5) Sensitivity Evaluation of Copper Film

The resistance of sensor element is $$R_0 = \frac{l}{A_w \sigma_0} = 21.5 \ \Omega$$

where, length (l)=25 mm
width (w)=10 $\mu$m
thickness (t)=2 $\mu$m
$A_w = w \times t$
$\rho_o = 1.72 \ \mu\Omega$m
$\sigma_o = 5.8$ e+7 (1/$\Omega$m)
$\alpha_o = 3,900$ ppm/° C.

Wire resistance can be written as: $R_w = R_o[1+\alpha_o(T_w-T_o)]$
In constant current mode (I=1 mA), the equation will be rewritten as $$IR_w = IR_o[1+\alpha_o(T_w-T_o)] = V_w = V_o[1+\alpha_o(T_w-T_o)] = V_o + \alpha_o V_o(T_w - T_o)$$

In case of unit overheat ratio (a≈1), temperature sensitivity of sensor considered can be expressed as $$S_{\theta,cc} = \frac{\partial E_w}{\partial \Theta} = \frac{\alpha_0 \bar{I} R_w R_0}{\bar{R}_a} \approx \alpha_0 IR_0 = 83.85 \ (\mu V/°C.)$$

Dynamic Response

1) Constant Current Anemometer (CCA)

For analysis of wire dynamic response, governing equation includes the term due to thermal energy storage within the wire:

$$W = H + dE/dt$$

The equation then becomes a differential equation:

$$I^2 R_w = (R_w - R_a)(A + BU^n) + C_w(dT_w/dt) \text{ or expressing } T_w \text{ in terms of } R_w:$$

$$I^2 R_w = (R_w - R_a)(A + BU^n) + C_w/\alpha_o R_o(dR_w/dt)$$

$C_w$=heat capacity of the wire($\rho_w c_w (\pi/4) d^2 l$)

$\alpha_o$=temperature coefficient of resistance (TCR) of the wire

The first-order differential equation is $$\frac{C_w}{\alpha_0 R_0(A + BU^n - I^2)}\frac{dR_w}{dt} + R_w = \frac{(A + BU^n)}{(A + BU^n - I^2)}R_a$$

And also can be characterized by a single time constant $\tau(=M)$:

$$M = \frac{C_w}{\alpha_0 R_0(A + BU^n - I^2)} = \frac{C_w(R_w - R_a)}{\alpha_0 R_0 I^2 R_a}$$

$$= \left\{\frac{c_w \rho_w}{\chi_0 \alpha_0}\right\}\left[\frac{\pi}{4} d^2\right]^2 \left\{\frac{(R_w/R_a - 1)}{I^2}\right\}$$

The normalized transfer function can be expressed as: $H_{wire}(\omega) = (1+\omega^2 M^2)^{-1/2}$ where, $\omega$ is the angular frequency. When or $\omega = 1/M$, the amplitude is reduced by −3 dB (or a factor of 1/1.414) and the corresponding phase lag is −45°. Frequency limit can be calculated from the time constant: $f_{cp} = 1/(2\pi M)$.

Figure 4:
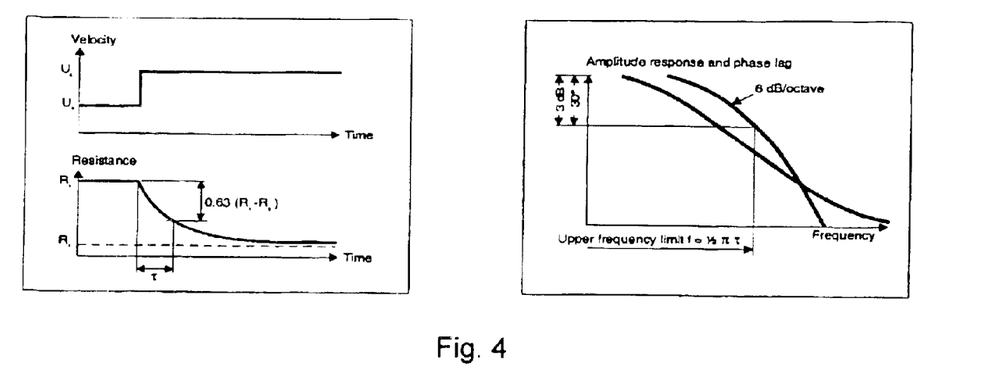
FIG. 4 are two diagrams that illustrate a Constant Current Anemometer (CCA) wire dynamic response to Step change in velocity or Sinusoidal velocity variation.

Frequency response of film-probes is mainly determined by the thermal properties of the backing material (substrate). The time constant for film-probes becomes: $M = \tau = (R/R^o)^2 I^2 r_s C_s k_s/(A+BU^n)^2$ $r_s$=substrate density
$C_s$=substrate heat capacity
$k_s$=substrate heat conductivity and the normalized transfer function becomes: $H_{film}(f) = 1/(1+(jf/f_{cp})^{0.5})$ Dynamic characteristic may be described by the response to Step change in velocity or Sinusoidal velocity variation as shown in FIG. 4.

Figure 5:
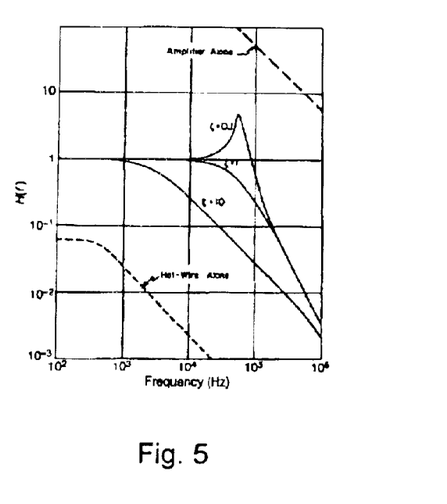
FIG. 5 is a diagram that illustrates Constant Temperature Anemometer (CTA) related amplitude transfer functions for velocity fluctuations.

2) Constant Temperature Anemometer (CTA)—FIG. 5.

CTA keeps the wire at constant temperature hence the effect of thermal inertia is greatly reduced. One method to determine the dynamic response of the anemometer is to apply the electronic disturbance signal, $e_t$, to the anemometer. The electronic testing may take the form of either a square-wave or sine-wave test. Through the many theoretical and experimental works, a second order system approach may be useful to illustrate the effect of system damping. The related equation for the fluctuating bridge voltage e can be expressed as $$\frac{d^2 e}{dt^2} + 2\zeta\omega_0\frac{de}{dt} + \omega_0^2 e = \omega_0^2\left\{S_u u + S_t\left[M\frac{de_t}{dt} + \left(1 + \frac{2\bar{R}_w(\bar{R}_w - R_a)}{R_a(\bar{R}_w + R_1)}\right)e_t\right]\right\}$$

where $\omega_0$ is the natural frequency of electronic circuit, $\zeta$ is the damping coefficient, and Su and St are the sensitivity coefficients of the velocity and electronic test signals. Assuming that the wire had an overheat ratio, $R_w/R_a$, of 1.5, the sensor had a time constant, M, of 0.4 ms, the amplifier had a time constant 25 $\mu$s and that the value of the system gain parameter was 1250, the natural frequency $f_0 = (\frac{1}{2}\pi)w_0$ as 55 kHz, FIG. 5 shows the related amplitude transfer functions for velocity fluctuations for values of $\zeta$ equal to 0.1, 1 and 10. The optimum response is seen to correspond to critical damping conditions ($\zeta \approx 1$). An increase in velocity usually results in an increase in the frequency response and a decrease in the value of the damping coefficients.

Figure 6:
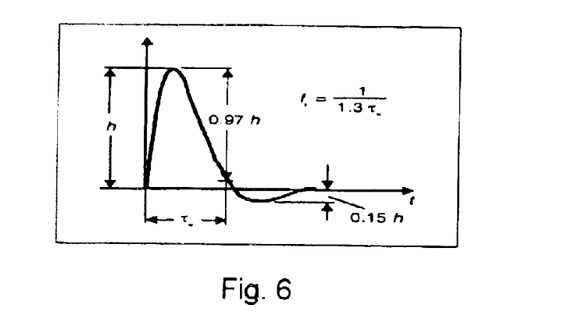
FIG. 6 is a diagram that illustrates a "SQUARE WAVE TEST" result by using an indirect method where the sensor is subjected to an electric sine wave that simulates an instantaneous change in velocity.

The time constant can be reduced to $$\tau_{CTA} = \tau_{CCA}/(2a \ S \ R_w)$$

where $\alpha$=overheat ratio
S=amplifier gain $R_w$=hot wire resistance
Frequency limit: fc defined as −3 dB amplitude damping.
3) Dynamic Calibration Methods—FIG. 6.
Direct Method For the direct method to be used, it is necessary to have a flow in which sinusoidal velocity variations of known amplitude are superimposed on a constant mean velocity Microwave simulation of turbulence (<500 Hz)
Sound field simulation of turbulence (>500 Hz)
Vibrating the probe in a laminar flow (<1000 Hz)

All methods are difficult and are restricted to low frequencies

Indirect Method "SQUARE WAVE TEST"

By using the indirect method, the sensor is subjected to an electric sine wave that simulates an instantaneous change in velocity and analyses the shape of the anemometer output. For a wire probe (1-order probe response): Frequency limit (−3 dB damping):

$$f_c = 1/1.3 \, t$$

Indirect methods are the only ones generally applicable in practice.

Square wave test determines frequency limits for wire probes. Time taken by the anemometer to rebalance itself is used as a measure of its frequency response.

Square wave test is primarily used for checking dynamic stability of CTA at high velocities.

Indirect methods cannot simulate effect of thermal boundary layers around sensor (which reduces the frequency response).

Figure 7:
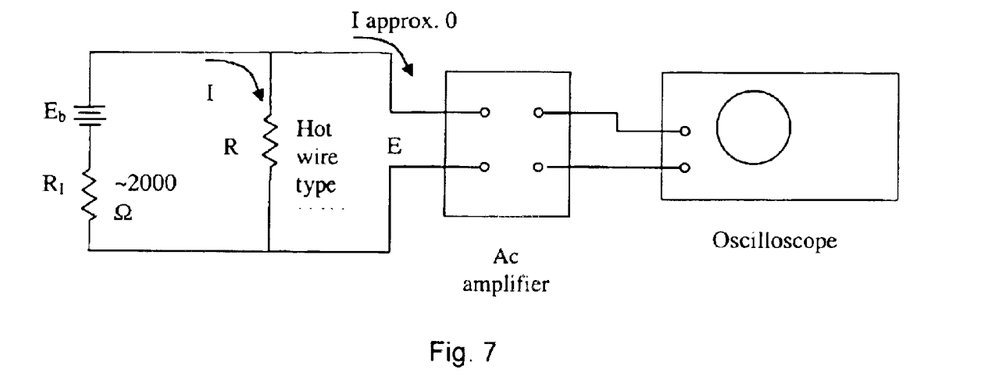
FIG. 7 illustrates an electric circuit to measure the ambient temperature and/or flow velocity relating to FIG. 6.

A suggested electric circuit to measure the ambient temperature and/or flow velocity is illustrated in FIG. 7. The circuit may be used to find the variation relationship between E and $R_w$, or Voltage drops based on the constant current source.

Specific Embodiments

In the disclosed embodiments, a fluid flow sensor system includes a thermal resistor type of sensor responsive to changes in fluid temperature and flow velocity. The system is based upon hotwire anemometer technology and provides a thermal transducer mechanism for sensing a known quantity of heat applied to a wire. The rate at which heat is transferred from the wire is proportional to the difference in temperatures of the sensor wire and of the fluid passing over the wire as a function of fluid velocity. The relationship can be described as: $Q = k(T_{sensor} - T_{fluid}) \cdot v$, where Q is the rate of heat transfer, k is a constant, T sub sensor is the temperature of the sensor, T sub fluid is the temperature of the fluid, and v is the velocity of the fluid.

The heat Q delivered to the sensor is proportional to the square of the current I passing through a wire that has a resistance R, so that: $Q = RI^2$.

Using two adjacent thermal resistors at different levels of bias current would allow measurement of the two unknowns $T_{fluid}$ and v. In this case, heat supplied to one sensor subsystem will transfer to the other sensor subsystem at a rate dependent on the fluid velocity. Thus, one sensor subsystem comprising a first thermal resistor would maintain a sufficient temperature differential with the fluid by taking heat from the bias current, while the other sensor subsystem comprising a second thermal resistor approaches and can be virtually at thermal equilibrium with the fluid. This is the principle by which some mass flow controllers control the flow rate. It may also be possible to use only one thermal resistance sensor to accomplish the same task by time multiplexing measurements performed at different bias currents. Thus, a single sensor acts as both sensor subsystems.

Figure 8:
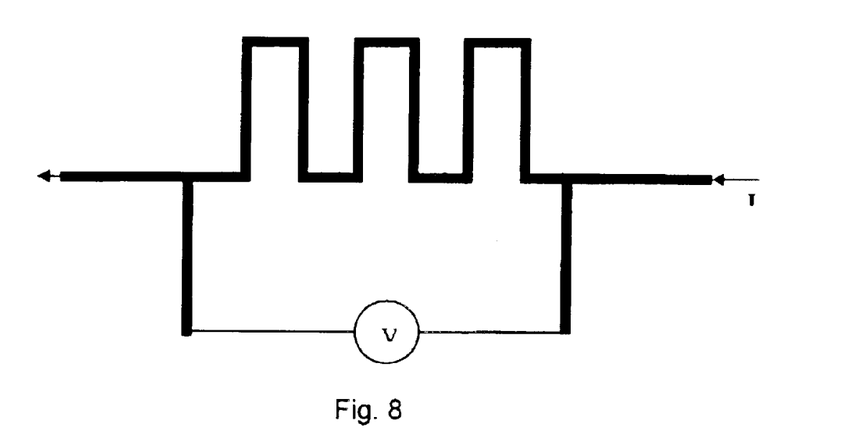
FIG. 8 illustrates a thermal resistor consisting of a main resistance with external leads and auxiliary leads for voltage sensing.

The temperature sensors used for the flow measurement will be based on the change in the electrical conductivity of a conducting material due to a change in the ambient temperature. Such a sensor can be called thermal resistor. It consists of the main resistance with external leads and auxiliary leads for voltage sensing as illustrated in FIG. 8. Change in the resistance of the main resistor is, to the first order approximation, proportional to the change in temperature. To measure change in the resistance, a small current will be injected through the main resistor leads and voltage will be measured across voltage sensing leads. This method of resistance measurement is known as the "four point" method since four contact points are needed. The advantage of this method is that it circumvents the difficulty associated with the effects of lead and contact resistances, which could dominate the overall resistance.

The sensor described above also has several advantages over the thermocouple type sensors. For one, thermocouple sensors would require two different metals for its operation. This complicates the sensor fabrication. In addition, the problem of cold junction (or reference junction) would have to be solved for thermocouple sensors. Lastly, as will be described below, the measurement of flow and temperature together could be based on regulating the amount of heat produced next to or by the temperature sensor.

In terms of the described embodiment, a micro-fluidic thermal transducer senses point velocity of fluid flow by measurement of temperature variations in a heated resistive wire. A primary resistance with external leads and separate auxiliary leads for voltage sensing is employed, wherein changes in resistance are proportional to changes in temperature. For measurement of change of resistance, a small current is applied through the primary resistor leads, and voltage is measured across voltage sensing leads. Thus, a four-point wire probe measurement method is employed, which provides a most accurate reading of desired temperature data to the extent that any resistances associated with lead and/or contact resistances are minimized. By the application of a known current through the wire probe, any changes in voltage are more accurately associated with fluidic temperature changes rather than with contact or lead resistances.

The temperature of the thermal resistor can be obtained from the following relations $$R_0 = \frac{l}{\omega \tau \sigma_0},$$

$$R = R_0 + \alpha R_0 (T - T_0),$$

$$V = V_0 + \alpha V_0 (T - T_0) I$$

where $R_0$ is the resistance at some reference temperature $T_0$, $\sigma_0$ is the conductivity at the reference temperature, l, ω, τ are the length, width, and thickness of the conducting wires, respectively, I is the bias current, V is the measured voltage, α is the thermo-resistance coefficient and, finally, T is the sensor temperature.

To appreciate the sensitivity of the proposed thermal resistor it is helpful to consider some specific numerical values of geometric and physical quantities in (3). The following list of numerical values will be assumed for the purpose of estimation:

τ=2×10⁻⁴ m, ω=10×10⁻⁴ m, l=25000×10⁻⁴ m, $\sigma_0$ 5×10⁷ 1/Ω·m, α=7000 ppm/C°, I=1 mA Using the above numbers, the relative change in the voltage signal per degree Celsius is given by $$\frac{\Delta V}{V_o} = \alpha = 7 \times 10^{-3},$$

the sensor resistance will be around 25 Ohms and the voltage signal itself is $\Delta V=2.5\times10^{-3}$ Volts=2.5 mV. This voltage signal is much larger than the typical thermocouple generated voltage signal. At the same time, noise coming from the thermal resistor is expected to be only a little larger than the thermocouple noise. This is due to the fact that noise increases as the square root of the wire resistance. Thus, it is expected that the proposed thermal sensor will have better sensitivity than a thermocouple.

In the described embodiment, the thermal resistor sensor is constructed of relatively thin layers of dielectric and electrically conducting materials having a low thermal mass. The dielectric layers serve as support and electrical insulation to protect the sensor from the environment. The conducting layer is a wire probe that forms the primary resistance of the sensor, and has leads that share connection junctions with auxiliary voltage sensing leads that are also connected to the primary resistance. In one disclosed embodiment, the supporting dielectric layers are formed as a flap that protrudes from the primary gasket body into the coolants or oil fluid aperture where sensing of the fluid is desired. The primary resistor is located on the flap, while all the leads are extended to areas outside of the gasket to provide electrical connection therewith.

Figure 9:
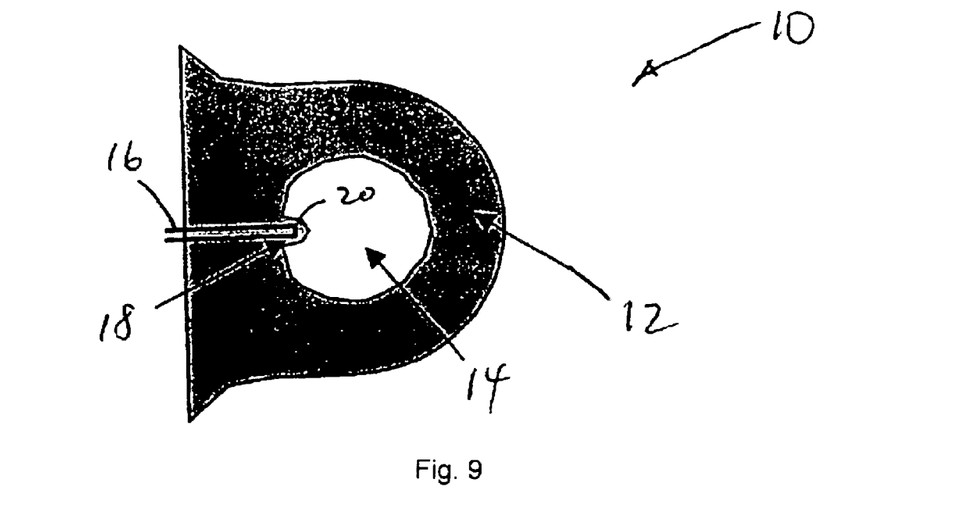
FIG. 9 is a plan view of one described embodiment of a fluid probe or fluid flow rate sensor of a fluid flow thermal transducer system of the present invention, shown positioned at the edge of a fluid aperture.

More specifically, now referring to FIG. 9, an embodiment of a flow rate sensor probe 10 is shown. The probe is deposited on a substrate that defines a support body 12 that surrounds a fluid aperture 14. As contemplated, the fluid aperture 14 is adapted for the passage of a coolant fluid or an oil through a combustion seal gasket of a vehicle. A fluid sensing wire probe 16 extends partially into the aperture opening, the end 18 of the fluid sensing probe 16 protruding radially into the aperture 14 on a flap 20 that supports the end 18 of the probe in the fluid stream. For purposes of flow sensing, a the fluid flow is orthogonal with respect to the described protrusion of the probe end 18.

Figure 10:
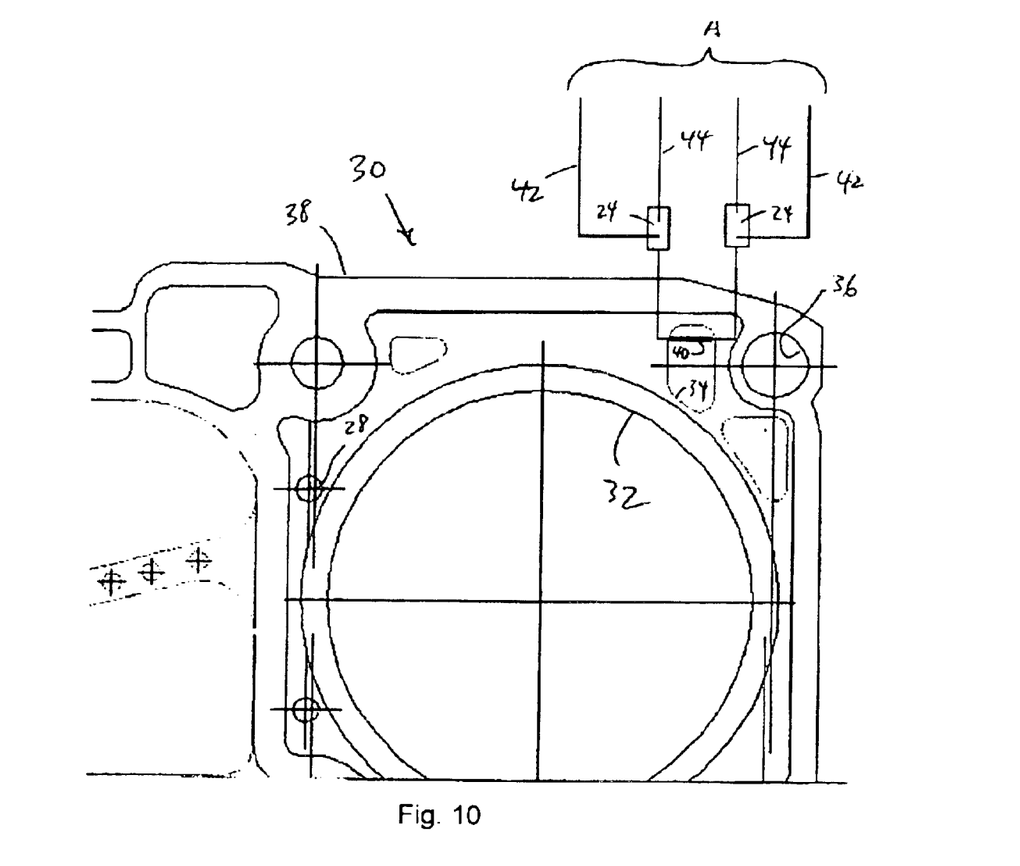
FIG. 10 is a plan view of an alternate embodiment of a fluid flow thermal transducer system as constructed in accordance with the present invention, shown in a conventional cylinder combustion gasket of an internal combustion engine.

Referring now to FIG. 10, a second embodiment of a flow rate sensor probe apparatus is depicted. The cylinder head gasket 30 includes a combustion aperture 32, a coolant aperture 34, a bolt hole aperture 36, and an oil aperture 28. Normally, there are a plurality of each of the aforedescribed apertures. The gasket 30 has a boundary or extremity 38 that is adapted to be fit between an engine block and a cylinder head (neither shown).

A thermal sensing probe 40 is part of a four-point probe hot wire anemometer system employed to detect fluid flow rates through the depicted coolant aperture 34. The sensing probe 40 extends across and from a pair of soldered plates wherein a pair of current supply wires 42 are connected to supply a fixed and controlled current through the probe 40. In parallel with the wire 42 are a pair of voltage measuring wires 44 used to sense changes in voltage. In this manner, the system is sensitive to very small temperature changes.

The current and voltage wires 42 and 44 respectively are connected to an engine control unit (ECU) which modulates or controls various engine functions as a function of the sensed flow rates being measured, as will be appreciated by those skilled in the art.

To the extent that the dimensions of the probe 40 are quite small, i.e. on the order of two microns in thickness, a substrate having relative robustness is required. Normally, a preferred material for the high heat and temperature requirements of an internal combustion engine coolant flow would be a non-conductive material, including materials such as a silicone based material. Circuit printing techniques can be utilized for the manufacture of such coated wiring. Those skilled in the art will appreciate that screen printing and other circuit manufacturing techniques can be employed for this purpose.

EXAMPLE

Figure 11:
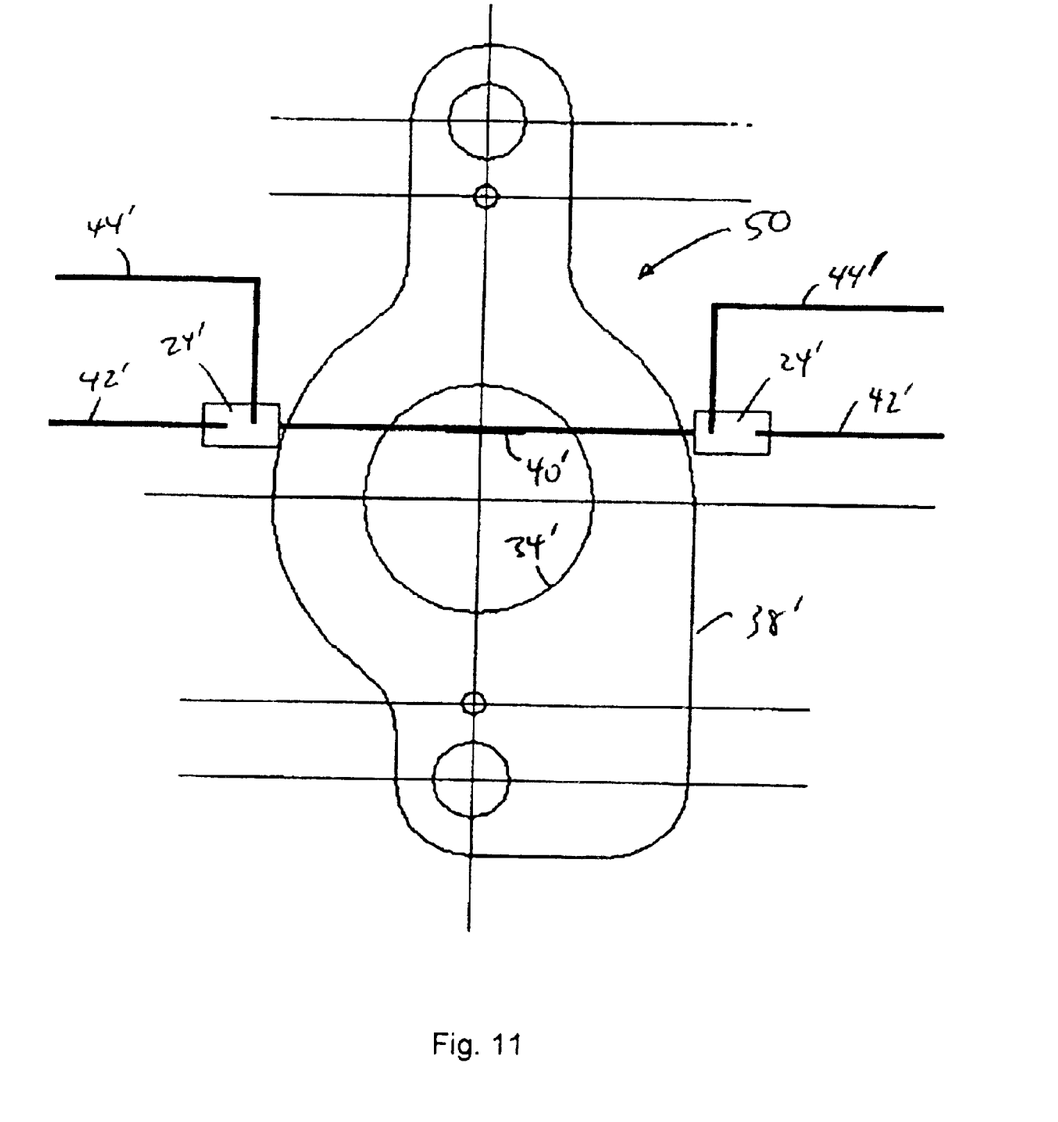
FIG. 11 is a plan view of a similar embodiment of a fluid flow transducer of the type depicted in FIG. 10, shown in a test fixture to simulate the fluid flow transducer system required for a conventional cylinder combustion gasket for an internal combustion engine.

A test fixture 50 is depicted in FIG. 11 for purposes of simulating the hot wire anemometer system of measuring fluid flow.

The test fixture 50 includes a coolant flow aperture 34' across which is deposited a thermal sensing probe 40' as shown. The test fixture has a boundary or extremity 38' similar to the boundary 38 of the gasket 30 described above. In addition, the test fixture 50 incorporates a pair of soldered plates 24', analogous to the plates 24 of the embodiment of the cylinder head gasket 30 of FIG. 2. Also analogously, the current supply wires 42 are directly attached to the soldered plates 24 as described in the previous embodiment, and share the plates with the voltage measuring wires 44'.

To the extent that the test fixture 50 is not exposed to the harsh heat and temperature environment of an internal combustion engine, i.e., the test fixture environment was subject only to a temperature of up to 150° centigrade to simulate a hot oil environment, a parylene substrate can be employed to protect the probe wire 40'.

The Method of Manufacturing A Test Fixture
General Discussion

A Method of manufacturing a test fixture now follows. The material of choice for conductivity, particularly in a microfluidic realm where measurements are made in microns of thickness, is copper. To the extent that the copper layers are quite thin, they are normally commercially available only with an aluminum backing plate or layer, as purchased for the manufacture of printed circuit boards. Thus, one micro-fabrication process for a gasket flow sensor for the test fixture 50 was completed as described with reference to FIG. 12 which depicts a sequential series of steps for the manufacture of a four-point probe hot wire anemometer to be used for measuring fluid flow in the environment described.

Figure 12:
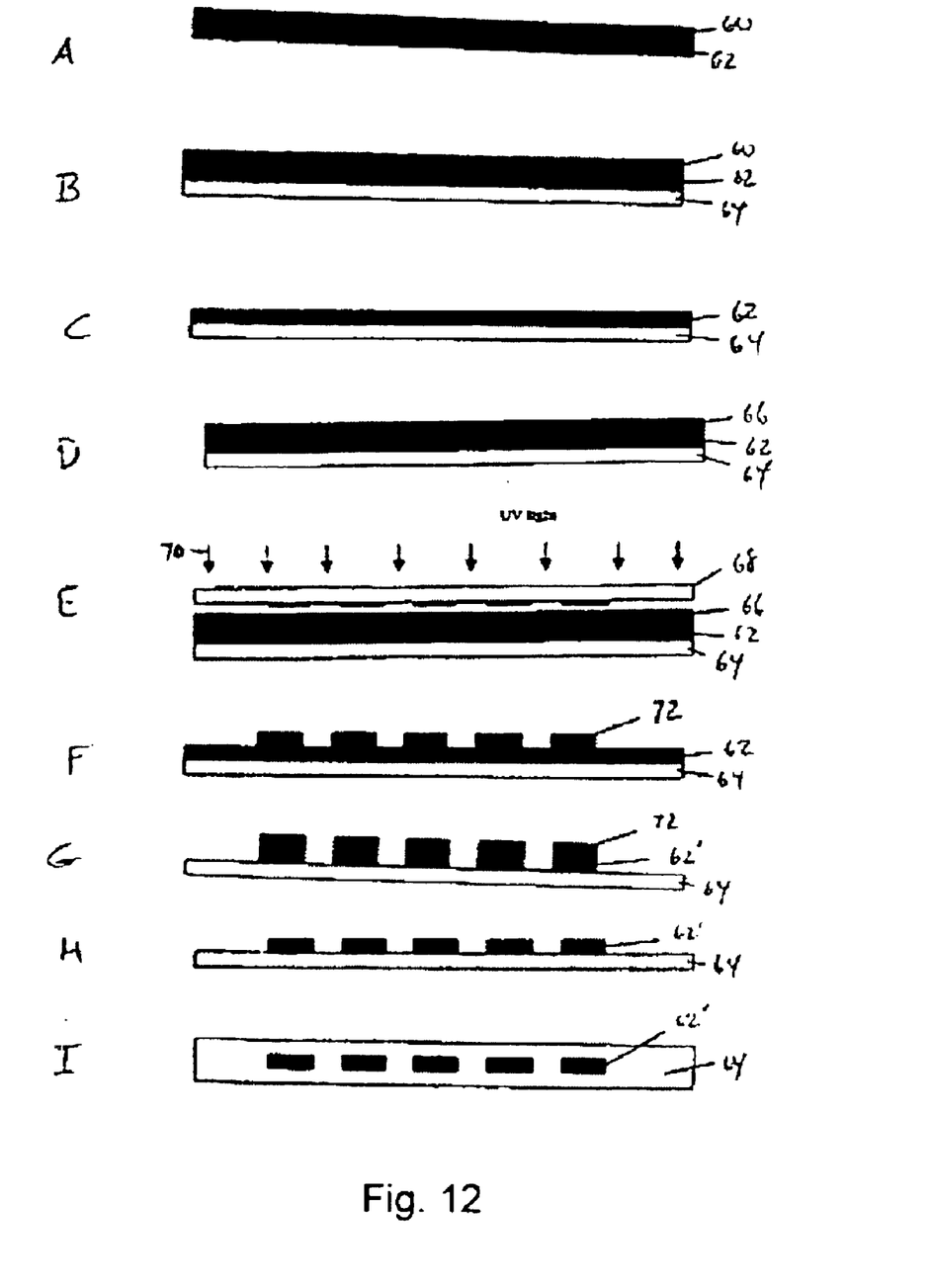
FIG. 12 is a series of sequential views of a micro-fluidic transducer system during steps of manufacture, as prepared for the embodiment of the test fixture shown in FIG. 11.

In the first step, a commercially purchased preparation of the aluminum and copper layers is depicted as item A of FIG. 12 with the aluminum 60 and copper 62 layers shown bonded together. In step B, a protective substrate, non-conductive parylene (a themoplastic film) is shown as layer 64, juxtaposed against the backside of the copper layer 62, so as to have the copper sandwiched between the aluminum layer 60 and the parylene layer 64.

Next, in step C the aluminum is etched away from the triple layer of parylene-copper, and aluminum to obtain only a copper-parylene combination of layers 62 and 64. At this point, a photoresist material 66 is applied to the copper side of the parylene-copper structure as shown in step D.

Next, a mask 68 with a desired pattern of the four point anemometer probe is applied against the photoresist 66. Ultraviolet light, shown as rays 70, is then applied to the photoresist through the mask, which is transparent to the UV light except in those areas of the pattern to be realized on the substrate. The photoresist is pre-baked prior to application of the ultraviolet light. After application of the ultraviolet the photoresist is post-baked and developed to provide the desired sensor pattern, shown only representatively.

Finally, the copper is etched away, leaving the sensor pattern of copper on the parylene sheet as shown in Figure G. The post-etch photoresist 72 is then removed by conventional techniques, and finally the exposed copper layers 62' of the desired pattern, which is typically discontinuous, are then covered with additional parylene so as to achieve the composite shown in sequence I.

Process for Test Sample Sensor

More specifically, test sensors for sensitivity tests could be designed and built by using the following procedure, a. Copper layer of UTC foil was coated by using Parylene deposition system (PDS). The substrate is aluminum layer.
b. Aluminum layer can be etched off by the solution of NaOH:DI water (60 g/1 litter)
c. Films on dummy silicon wafer are baked on the hot plate at 120° C. for 10 minutes for humid removal.
d. Spin coat positive Shipley Microposit 1818 at 3500 rpm for 20 seconds for more thickness of photoresist.
e. Pre-bake the film on the hot plate at 115° C. for 1 minute.
f. Place the film put on the chuck of mask aligner for exposing the UV light. Expose for 8 sec with 20 mW intensity. Note that the thickness of substrate should be checked (Parylene+Copper+Dummy wafer).
g. Develop the exposed photoresist using DI water and Microposit 351 developer (=5:1) for 1.1 minute and then Rinse.
h. Check the sensor pattern using microscope
i. Rinse and then post-bake the film on the hot plate at 120~140° C. for 10 minutes.
j. Dip the film into the Copper etchant for 15 sec to etch off the Copper at room temperature and then Rinse
(Note that ferric chrolide solution was used for copper etching and the black sludge left on the film surface was removed by soft touching of clean paper. But, the etching speed of etchant used is very fast and it makes the etching time hard to control. In practice it most likely would be desirable to use a weaker etchant like sodium persulphate. Morover, it would also be desirable to clean the etchant off quickly and accurately after etching to prevent overetching and undercut. For removing the aluminum smut, it should be dipped in a weaker solution containing 50 grams/liter of sodium persulphate and 3 grams/liter of sulphuric acid for 1 minute. It should be allowed about 0.1 micron of copper to etch off during the smut removal for it to be sufficient.)
k. Remove the photoresist using Microposit 1112A remover and then Rinse the film.
l. Wires are needed for soldering to the electrodes for electric contacts. One concern is that the sensor pattern may be broken due to the heat of soldering gun. A preferred alternative includes Silver Epoxy
m. Coat the side of copper layer with wires by using Parylene deposition system (PDS).

Figure 13:
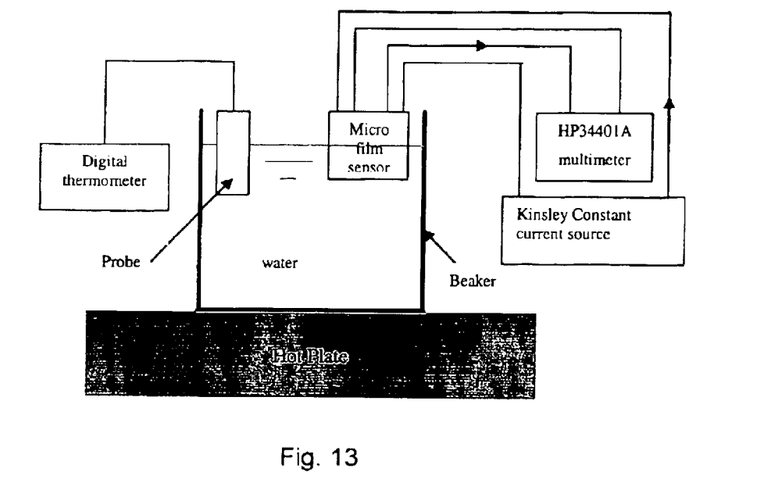
FIG. 13 illustrates a schematic of a test fixture designed for a temperature sensitivity test of a microfilm sample sensor between temperature and voltage.

Batch Process for Sample Sensor a. Same as the procedure a to k of previous micro-fabrication process.
b. Print the circuit lines or Draw them by using the Etch resist ink pen on the flexible circuit board.
c. Etch off the copper on the flexible circuit board
d. Glue or bond the flow sensor onto the flexible circuit board
e. Make sure of connecting the circuit lines with the electrodes of flow sensor using the conductive micro-tip pen.
f. Coat the side of copper layer and circuit board by using Parylene deposition system (PDS).
g. Insert the flexible circuit board with flow sensor between the gaskets for the Mock-up test Experimental Tests and Results Temperature Sensitivity (Calibration) Test—FIG. 13

Sensitivity tests of microfilm sample sensor between temperature and voltage were carried out. Voltage drops of a microfilm sensor were measured by an HP34401, a multimeter, which is shown in the schematic test setup of FIG. 13. For the calibration purpose of heated water temperature, a digital thermometer was used. Simultaneously, water temperature and voltage change of the sample sensor were recorded by hand. A four points measurement method was employed.

Based on the theoretical calculation discussed above, the sensitivity was 83.85 $\mu V/°$ C. and determined as follow:

The resistance of sensor element is $$R_0 = \frac{l}{A_w \sigma_0} = 21.5 \, \Omega$$

where, length (l)=25 mm
width (w)=10 $\mu$m
thickness (t)=2 $\mu$m
$A_w = w \times t$
$\rho_o = 1.72 \, \mu\Omega m$
$\sigma_o = 5.8 \, e+7 \, (1/\Omega m)$
$\alpha_o = 3,900$ ppm/° C.

Wire resistance can be written as: $R_w = R_o[1+\alpha_o(T_w-T_o)]$

To get the limitation of the applied current, the applied current was increased monotonically. Under these test conditions, water temperature was 21° C. The results are shown in FIG. 14.

Figure 14:
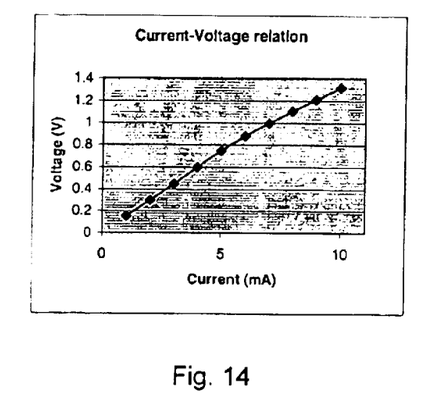
FIG. 14 is a diagram of results illustrating the limitation of applied current obtained from the test fixture in FIG. 13.

From the data set forth in FIG. 14, in order to get the sensitivities of temperature and flow velocity, it is possible to apply a current value that may range from 1 mA to 5 mA. Preferably, 1 mA is selected as an applied constant current to prevent the wire from burnout.

In constant current mode (I=1 mA), the equation will be rewritten as $$IR_w = IR_o[1+\alpha_o(T_w-T_o)] = V_w = V_o[1+\alpha_o(T_w-T_o)] = V_o + \alpha_o V_o(T_w-T_o)$$

In case of unit overheat ratio (a≈1), temperature sensitivity of the sensor can be expressed as $$S_{\theta,cc} = \frac{\partial E_w}{\partial \Theta} = \frac{\alpha_0 I \overline{R}_w R_0}{R_a} \approx \alpha_0 I R_0$$
$$= 3900e - 6 \times 21.5 \times 1e - 3$$
$$= 83.85 \, (\mu V/°C.)$$

Experimental tests were carried out two times with the same film sensor in cases of heating up by hot plate and cooling down in nature. The resistance of sensor of the sensor was 177.45 $\Omega$ and constant current source generated 1 mA exactly before test. But, the current was measured to 0.8420 mA after connecting the wires with the sensor. In here, consider only the resistance of real film sensor (21.5 $\Omega$->177.45 $\Omega$) to make sense of the experimental sensitivity. It should be influenced from the resistance of both electrodes and lengthy wires.

$$S_{\theta,cc} \approx \alpha_0 I R_0 = 3900e - 6 \times 177.45 \times 0.8429e - 3 = 583.3 (\mu V/° C)$$

Figure 15A:
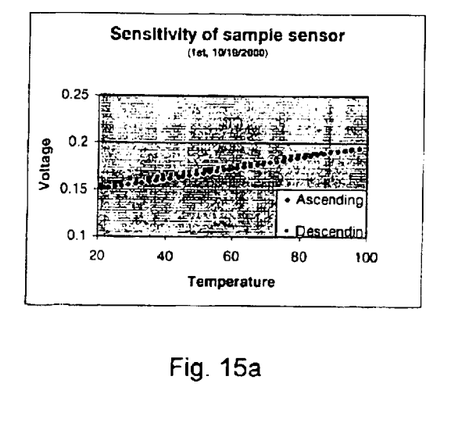
FIGS. 15a and 15b are diagrams that illustrate results obtained through experiments utilizing the test fixture of FIG. 13 showing that the voltage values are linearly proportional to the water temperature.
Figure 15B:
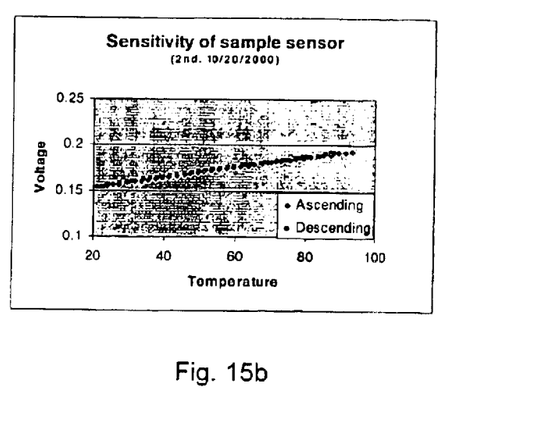

Through the experiments, FIGS. 15a and b are obtained. It has been shown in the Figures a and b that the voltage values are linearly proportional to the water temperature. Approximately, the sensitivity of the film sensor was 625 $\mu V/°$ C. which has 6.7% error compared to the theoretical calculation.

Flow Velocity Measurement

A. Method I

1. In the constant current type, a fine resistance wire carrying a fixed current is exposed to the flow velocity.
2. The wire attains an equilibrium temperature when the $i^2R$ heat generated in it is just balanced by the convective heat loss from its surface.

$$W=H \rightarrow I^2 \cdot R_w = h \cdot A \cdot (T_w - T_a) \rightarrow I^2 R_w = (Nu\ k_f/d)A(T_w - T_a)$$

$$Nu = A_1 + B_1 \cdot Re^n = A_2 + B_2 \cdot U^a$$

"King's law"

$$I^2 \cdot R_w^2 = E_w^2 = (T_w - T_a)(A_3 + B_3 \cdot U^n)$$

h=film coefficient of heat transfer
A=heat transfer area
d=wire diameter
$T_w$=wire temperature
U=flowing velocity
$T_a$=temperature of flowing fluid
$k_f$=heat conductivity of fluid
Nu=dimensionless heat transfer coefficient
$A_i, B_i$=Calibration constants Note: Since the convection film coefficient is a function of flow velocity, the equilibrium wire temperature is a measure of velocity. The wire temperature can be measured in terms of its electrical resistance.

Figure 16:
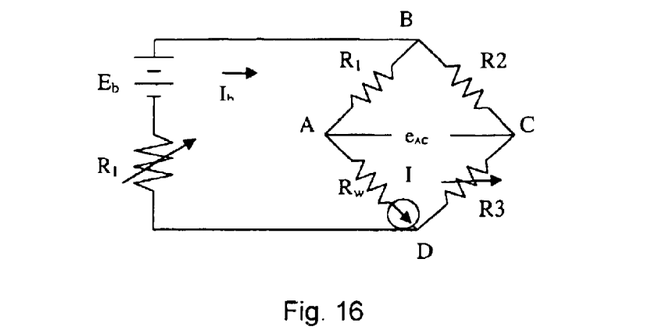
FIG. 16 illustrates an electric circuit designed to measure flow velocity.

3. Assume that the measured fluid is at the same temperature and pressure is fairly simple.
4. Build circuit as shown in FIG. 16.
5. In calibration, flowing velocity U is set at known value $U_1$. Then $R_I$ is adjusted to set the current I at a value low enough to prevent wire burnout but high enough to give adequate sensitivity to velocity.
6. The resistance $R_w$ will come to a definite temperature and resistance. i.e., meter deflection indicates the resistance change of the bridge circuit ($e_{AC} \neq 0$, deflection method).
7. Then $R_3$ is adjusted to balance the bridge ($e_{AC}=0$ based on the relation of $R_I/R_w = R_2/R_3$, null method). This adjustment is essentially a measurement of wire temperature, which is held fixed at all velocities (=constant temperature).
8. Plot $I_1^2$ and $U_1^{1/2}$.
9. Flowing velocity U is changed to a new value, causing the wire temperature and $R_w$ to change thus unbalancing the bridge.
10. $R_w$, and thus wire temperature, is restored to its original value in step 6 by adjusting the current I (by means of $R_I$) until the bridge balance is restored ($R_3$ is not changed).
11. The new current I and the corresponding flowing velocity U may be plotted on the calibration curve with axis of $I^2$ and $U^{1/2}$ and this procedure is repeated for the many velocities as desired.

B. Method II—FIG. 17

Figure 17:
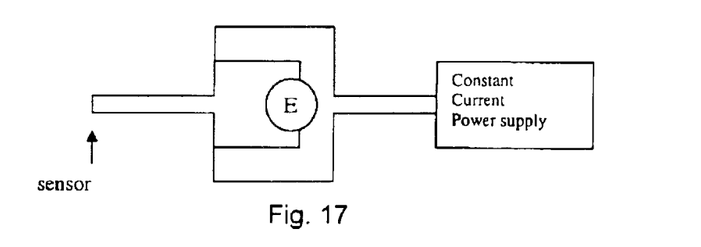
FIG. 17 illustrates a schematic for a method of obtaining a flow velocity measurement by measuring the voltage drop across a probe sensor.

1. Using 4-points measurement.
2. Applied constant currents, which ranged from 0 to 10 mA to prevent the sensors from burning out.
3. The output voltage is obtained by measuring the voltage drop across the probe sensor. This circuit can be used for steady-state measurements.

Flow Sensitivity Test (Calibration Test)

Figure 18:
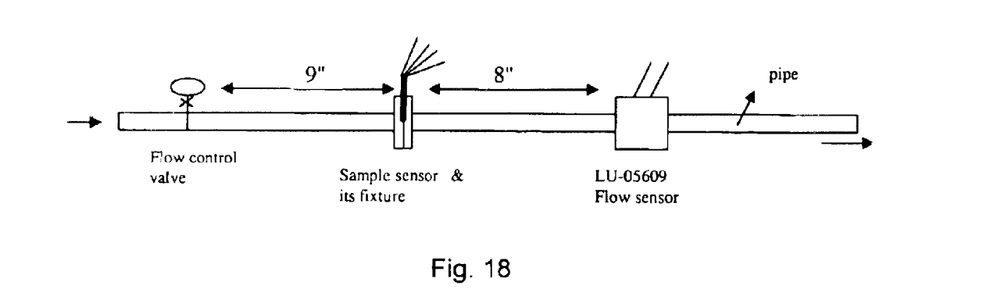
FIG. 18 illustrates a schematic of a test fixture designed to measure flow velocity as illustrated in FIG. 17 in order to obtain the sensitivity of a sample flow sensor.

Based on Method II above, flow sensor evaluation and testing were carried out in order to obtain the sensitivity of the sample flow sensor. The test setup schematic is shown in FIG. 18. The sensor was installed between two steel plates with gaskets and hooked up the digital meter (Instek: DM8055) and constant current power supply. To calibrate the sample sensor, LU-05609 flow sensor manufactured by Cole Parmer was installed.

Test Results

1. Current vs. Resistance (No Flow)
   a. 0 to 5 mA—FIG. 19

Figure 19:
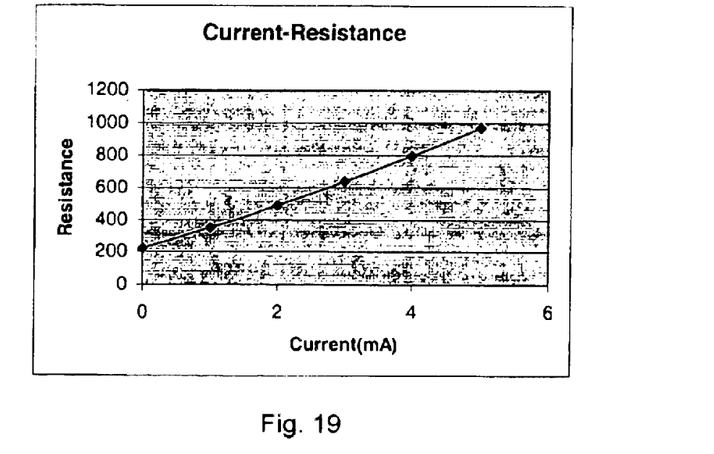
FIG. 19 is a diagram that illustrates the test results of FIG. 18 showing current vs. resistance where current is 0 to 5 mA.
Figure 20:
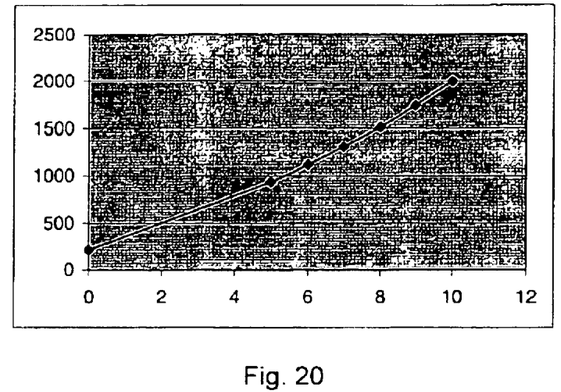
FIG. 20 is a diagram that illustrates the test results of FIG. 18 showing current vs. resistance where current is 5 to 10 mA.

| Current(mA) | Resistance($\Omega$) |
|---|---|
| 0 | 221.81 |
| 1 | 351.84 |
| 2 | 490.73 |
| 3 | 639.46 |
| 4 | 799.29 |
| 5 | 971.63 | b. 5 to 10 mA—FIG. 20

| Current(mA) | Resistance($\Omega$) |
|---|---|
| 0 | 215.39 |
| 5 | 936.44 |
| 6 | 1114.36 |
| 7 | 1308.24 |
| 8 | 1518.65 |
| 9 | 1748.62 |
| 10 | 2001.5 |

Constant currents were applied to the sample sensor with no flow condition in order to check the burnout of the sample sensor up to 10 mA. There was no burnout with 10 mA and also current applied was linearly proportional to the resistance of a sample sensor as expected. With flow of the coolant, currents of 1 mA, 5 mA, and 10 mA were applied, respectively. With 1 mA, good results were not achieved. This may come from the fact that test sensor required more heat generations to have good heat transfer to the flow. That's one of the reasons why the applied currents were increased.

2. Flow Rate vs. Voltage Drop

Figure 21:
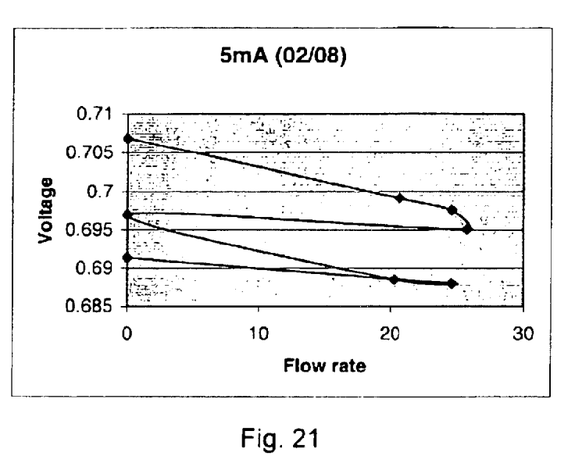
FIG. 21 is a diagram that illustrates Test I results of FIG. 18 where flow rate vs. voltage drop are measured where current is 5 mA.

Test I: flow test (5 mA)—FIG. 21

| Test I: flow test (5 mA) - FIG. 21 | |
|---|---|
| Flow rate(G/m) | Voltage drop(VDC) |
| 0 | 0.7069 |
| 20.7 | 0.6991 |
| 24.7 | 0.69751 |
| 25.8 | 0.69503 |
| 0 | 0.69697 |
| 20.3 | 0.6885 |
| 24.7 | 0.68793 |
| 0 | 0.69134 |

Figure 22:
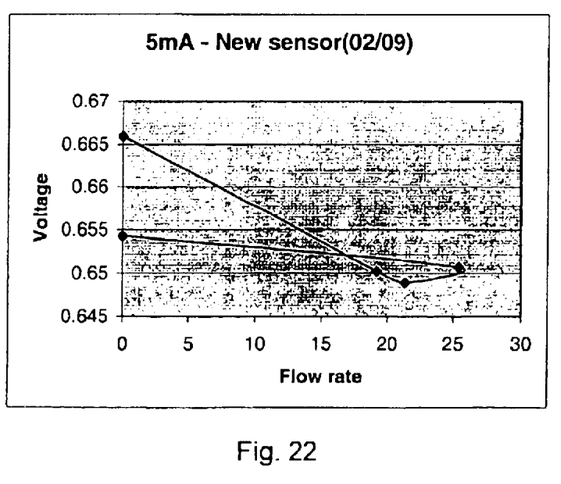
FIG. 22 is a diagram that illustrates Test II results of FIG. 18 where flow rate vs. voltage drop are measured where current is 5 mA.

Test II: flow test (5 mA)—FIG. 22

| Flow rate(G/m) | Voltage drop(VDC) |
|---|---|
| 0 | 0.66594 |
| 19.2 | 0.65021 |
| 21.4 | 0.6489 |

-continued

| Flow rate(G/m) | Voltage drop(VDC) |
|---|---|
| 25.4 | 0.65069 |
| 0 | 0.65431 |

Figure 23:
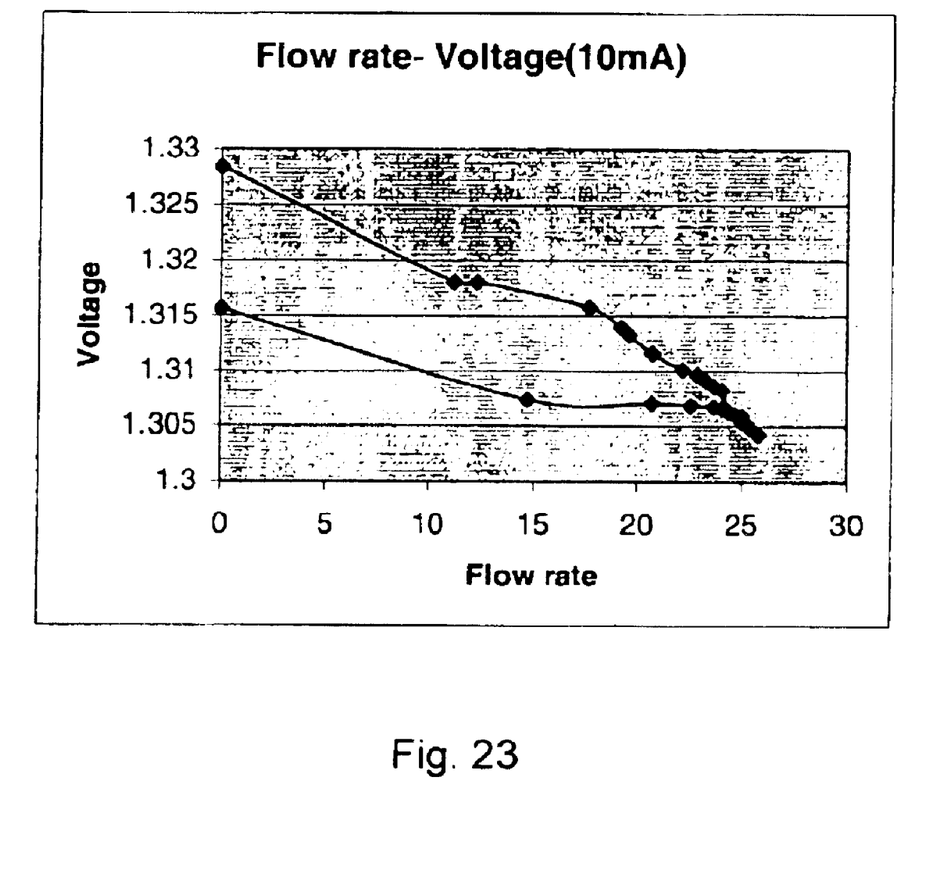
FIG. 23 is a diagram that illustrates Test III results of FIG. 18 where flow rate vs. voltage drop are measured where current is 10 mA.

Test III: flow test (10 mA)—FIG. 23

| Flow rate(G/m) | Voltage drop(VDC) |
|---|---|
| 0 | 1.32838 |
| 11.2 | 1.31805 |
| 12.3 | 1.31805 |
| 17.7 | 1.31578 |
| 19.2 | 1.31398 |
| 19.6 | 1.31325 |
| 20.7 | 1.31162 |
| 22.1 | 1.31009 |
| 22.8 | 1.30963 |
| 23.2 | 1.30907 |
| 23.6 | 1.30858 |
| 24 | 1.30827 |
| 24.3 | 1.30632 |
| 24.7 | 1.30595 |
| 25 | 1.30535 |
| 25.4 | 1.30486 |
| 25.8 | 1.30428 |
| 25 | 1.30584 |
| 24 | 1.30647 |
| 23.6 | 1.3067 |
| 22.5 | 1.30684 |
| 20.7 | 1.307 |
| 14.7 | 1.30734 |
| 0 | 1.31563 |

1) Through the test results above, the sensitivity of a sample flow sensor can be approximately estimated, ~1 mV/Gal/min. This value is not exact and well not approximated. There are many uncertainties that resulted from the extrusion-type design of a micro sample sensor and non-steady-state (irregular) flows in pipe due to various diameter changes of test setup and not enough distances between the valve and sensors.
2) An extrusion type sensor may not have enough strength to resist the high velocity flows so that it would be deflected and flipped during measurement. Therefore, preferably this kind of flexible sensor design should be modified and enhanced into the design of the cross-hole type sensor in order to guarantee the robustness of flow measurement.
3) There was hysteresis between voltage drop and flow rate signals, possibly due both to irregular flows nearby the sample sensor as well as instrumentation limitations.
4) To obtain the regular flow (steady state flow), flow control valve should be used for controlling the coolant flow and it should be positioned to have enough distance from the sample sensor.
5) Flow sensor (LU-05609) seems to have low dynamic response, which may be due to manually controlled valve. It also cannot measure the low range of flow rate 0 to 18 Gal/min, which may be due to not enough flow to rotate the turbine or low resolutions.

In summary, from a standpoint of testing, fluid velocity and fluid temperatures were calibrated separately. Through the measurement of fluid (water) temperature, voltage drops were linearly proportional to the fluid temperature. The sensitivity of the sample sensor was 625 $\mu V/°C$. To get this value 1 mA constant currents were applied to the same sample sensor with no flow condition. To check the burnout of a sample sensor, constant currents were applied up to 10 mA. No burnout was found of a sample sensor with 10 mA. The applied currents were linearly proportional to the resistance of the sample sensor with no flows.

For the flow rate calibration, testing tried to measure the flow rate or flow velocity with currents of 5 mA and 10 mA, respectively. Currents of 1 mA were also tried, but the results were not desirable.

From the test results, it is possible to approximate the sensitivity of a sample flow sensor, 1 mV/Gal/min. However, there were many uncertainties that resulted from the extrusion type design of the micro sensor and the non-steady-state (irregular) flows in the pipe due to various diameter changes of the test setup and the lack of sufficient distance between the valve and the sensors. Therefore, it is preferred that a cross-hole type sensor be used under appropriate circumstances to have sufficient strength for resistance to high velocity flows without deflection or flipping, and that the distance between the valve and sensors be adjusted.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. An apparatus comprising a gasket adapted for insertion between mated surfaces for sealing therebetween, said gasket comprising:
   at least one aperture with an edge for accommodating a flow of fluid therethrough;
   at least one sensor responsive to temperature for sensing heat transfer indicia, wherein said sensor extends partially into said fluid aperture of said gasket and away from said edge so as to be in direct contact with fluid passing through the fluid aperture.

2. An apparatus as recited in claim 1, wherein said sensor comprises an anemometer device.

3. An apparatus as recited in claim 1, wherein said gasket is subjected to a range of temperatures including ambient temperature and an elevated operational temperature.

4. A sensor for use in a multi-layer gasket including at least one aperture having an edge and accommodating a flow of fluid and varying temperatures and pressures, said sensor extending partially into said aperture such that said sensor is capable of being in direct contact with the flow of fluid.

5. A sensor as recited in claim 4 including a thermal resistor.

6. A sensor as recited in claim 5, wherein said sensor is a hotwire anemometer probe including a thermal transducer mechanism for sensing a known quantity of heat applied to a wire.

7. A sensor as recited in claim 5, wherein a single thermal resistor sensor uses multiplexing measurements at different bias currents to comprise first and second sensor subsystems.

8. A sensor for use in a multi-layer gasket including:
   at least one aperture having an edge and accommodating a flow of fluid and varying temperature and pressures;
   said sensor extending partially into said aperture;
   wherein said sensor includes two sensor subsystems with adjacent thermal resistors at different levels of bias current to allow measurement of third temperature and fluid velocity.

9. A sensor subsystem as recited in claim 8, wherein a first sensor subsystem with a first thermal resistor maintains a sufficient temperature differential with a flowing fluid by taking heat from said bias current.

10. A sensor as recited in claim 8, wherein a second sensor subsystem with a second thermal resistor approaches thermal equilibrium with a flowing fluid.

11. A sensor as recited in claim 10, wherein heat supplied to one of said thermal subsystems is transferred to the other of said thermal subsystems at a rate dependent on fluid velocity.

12. A sensor for use in a multi-layer gasket including:

at least one aperture having an edge and accommodating a flow of fluid and varying temperatures and pressures;

wherein said sensor extends partially into said aperture;

wherein said sensor further includes a thermal resistor that is based on a change in electrical conducting material due to a change in ambient temperature.

13. A sensor as recited in claim 12, wherein said sensor comprises a patterned metallic layer embedded within a non-conductive material.

14. A sensor as recited in claim 13, wherein said metallic layer includes copper and said non-conductive material includes a thermoplastic film.

\* \* \* \* \*